No. 692,866. Patented Feb. 11, 1902.
E. M. LAWRENCE.
FISH CUTTING TABLE.
(Application filed Oct. 24, 1901.)
(No Model.)
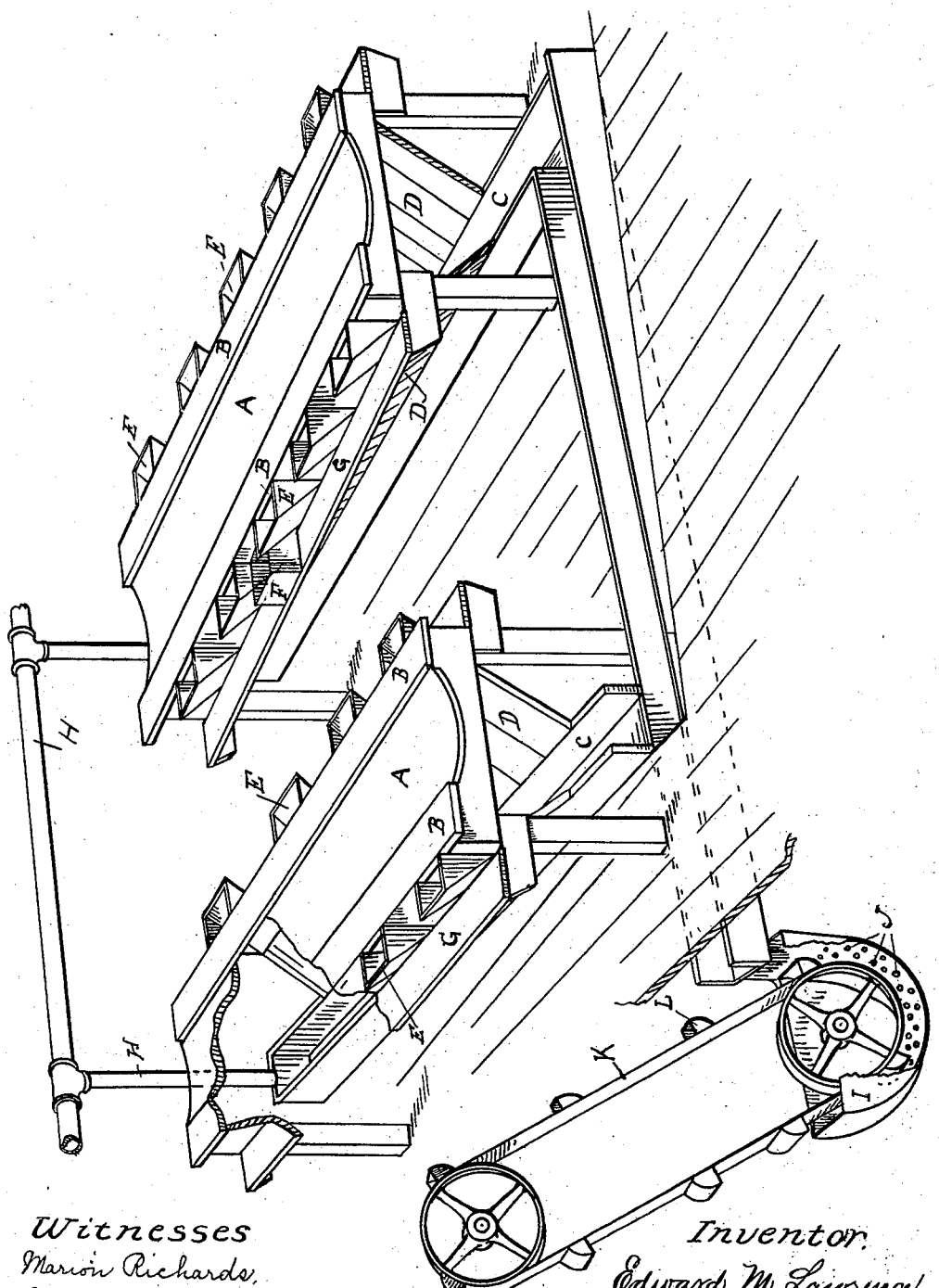
Witnesses
Marion Richards,
Thomas L. Talbot.
Inventor.
Edward M. Lawrence,
by Verrill & Clifford,
attorneys.

UNITED STATES PATENT OFFICE.

EDWARD M. LAWRENCE, OF LUBEC, MAINE.

FISH-CUTTING TABLE.

SPECIFICATION forming part of Letters Patent No. 692,866, dated February 11, 1902.

Application filed October 24, 1901. Serial No. 79,779. (No model.)

*To all whom it may concern:*

Be it known that I, EDWARD M. LAWRENCE, a citizen of the United States, residing at Lubec, in the county of Washington and State of Maine, have invented certain new and useful Improvements in Fish-Cutting Tables; and I do hereby declare the following to be a full, clear, and exact description of the invention, such as will enable others skilled in the art to which it appertains to make and use the same.

My invention relates to improvements in fish-cutting tables.

In the preparation of small fish for canning it is necessary to cut off the heads, and where canning is done on a large scale it becomes an important matter to arrange the cutting-table so as to be convenient for the cutter, both as respects the placing of the fish to be cut with reference to the cutting-block and the disposition of the fish and waste.

The object of the present invention is to provide a structure which shall be specially adapted to these purposes.

In the drawing herewith accompanying and making a part of this application the figure shows an isometric view of my improved apparatus, parts being broken out to show the interior.

In the drawing I have shown two tables, the waste-troughs delivering into a second trough common to both of them. Other than this the two tables are substantially duplicates, and the description of one will apply equally to the other.

In said drawing, A represents a receptacle for the fish to be cut. On either side of this receptacle is a cutting-block B. If desired, the receptacle may be depressed below the surface of the block. Beneath the table is an inclined trough C, and from the outer edge of the table the walls D converge downwardly to the edge of the trough. Spaced apart and outside of the cutting-block are a series of chutes E, terminating at the top near the block, open at the top, and extending downwardly to the inside of the converging walls aforesaid. The chutes are spaced apart sufficiently to receive the cutting-boxes F, which rest upon a shelf or platform G. The inclination of the walls should be sufficient to insure the fish heads and waste falling into the trough by the action of gravity. The trough inclines sufficiently so that the water introduced from a supply-pipe H at the higher end will convey the waste down the troughs and into a tank I, located at the end of the trough. This tank has perforations J to allow water to drain out, and buckets L on an endless carrier K take up the solid matter from said tank and transfer it to some place of deposit.

The operation of my improved apparatus is as follows: The fish are placed upon the platform or receptacle. The cutters, standing in front of the chutes, sever the heads from the bodies upon the block, scrape the waste into the chute, whence it falls into the trough below, and the bodies into the boxes at the sides of the chutes. The water conveys the waste down the trough and discharges it into the perforated tank at the end of the trough, and the buckets convey it to barrels or boxes or compost heaps, as the case may be. Any number of tables may be arranged to discharge the waste into a common trough, and the cutting-blocks may be arranged on one or both sides of the receptacle for the uncut fish and still be within the scope and spirit of my invention.

Having thus described my invention and its use, I claim—

1. In a fish-cutting table, a suitable receptacle for the uncut fish, a cutting-block at the side thereof, an inclined trough beneath the table, converging walls extending from the table to the trough, chutes extending from points adjacent to the cutting-table to said inclined walls and means for introducing water into the higher end of said trough, substantially as and for the purposes set forth.

2. In a fish-cutting table, a suitable receptacle for the uncut fish, a cutting-block at the side thereof, an inclined trough beneath the table, converging walls extending from the table to the trough, chutes extending from points adjacent to the table to said inclined walls, means for introducing water into the higher end of said trough, a perforated tank at the end of said trough and an endless carrier with buckets to convey the solid matter from said tank, substantially as and for the purposes set forth.

In testimony whereof I affix my signature, in presence of two witnesses, this 19th day of October, 1901.

EDWARD M. LAWRENCE.

In presence of—
MILLARD REYNOLDS,
FRANK H. WISWELL.